Figure 29:
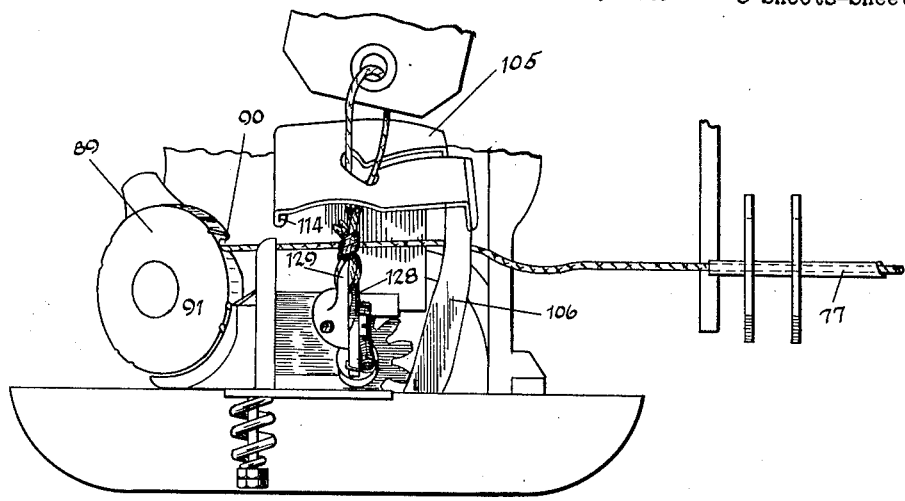

Aug. 31, 1926.
A. H. SAXTON ET AL
1,597,696
TAG LOOP TIER
Filed August 30, 1923   8 Sheets-Sheet 1
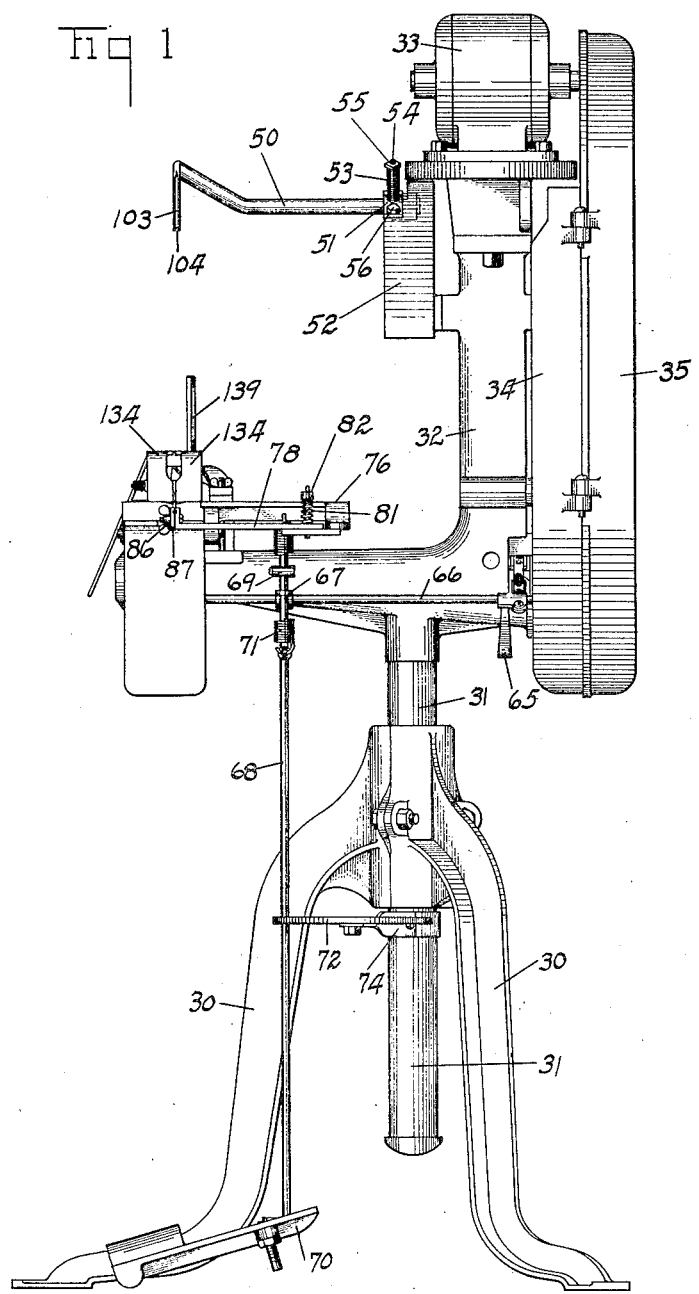

Aug. 31, 1926.
A. H. SAXTON ET AL
1,597,696
TAG LOOP TIER
Filed August 30, 1923   8 Sheets-Sheet 2
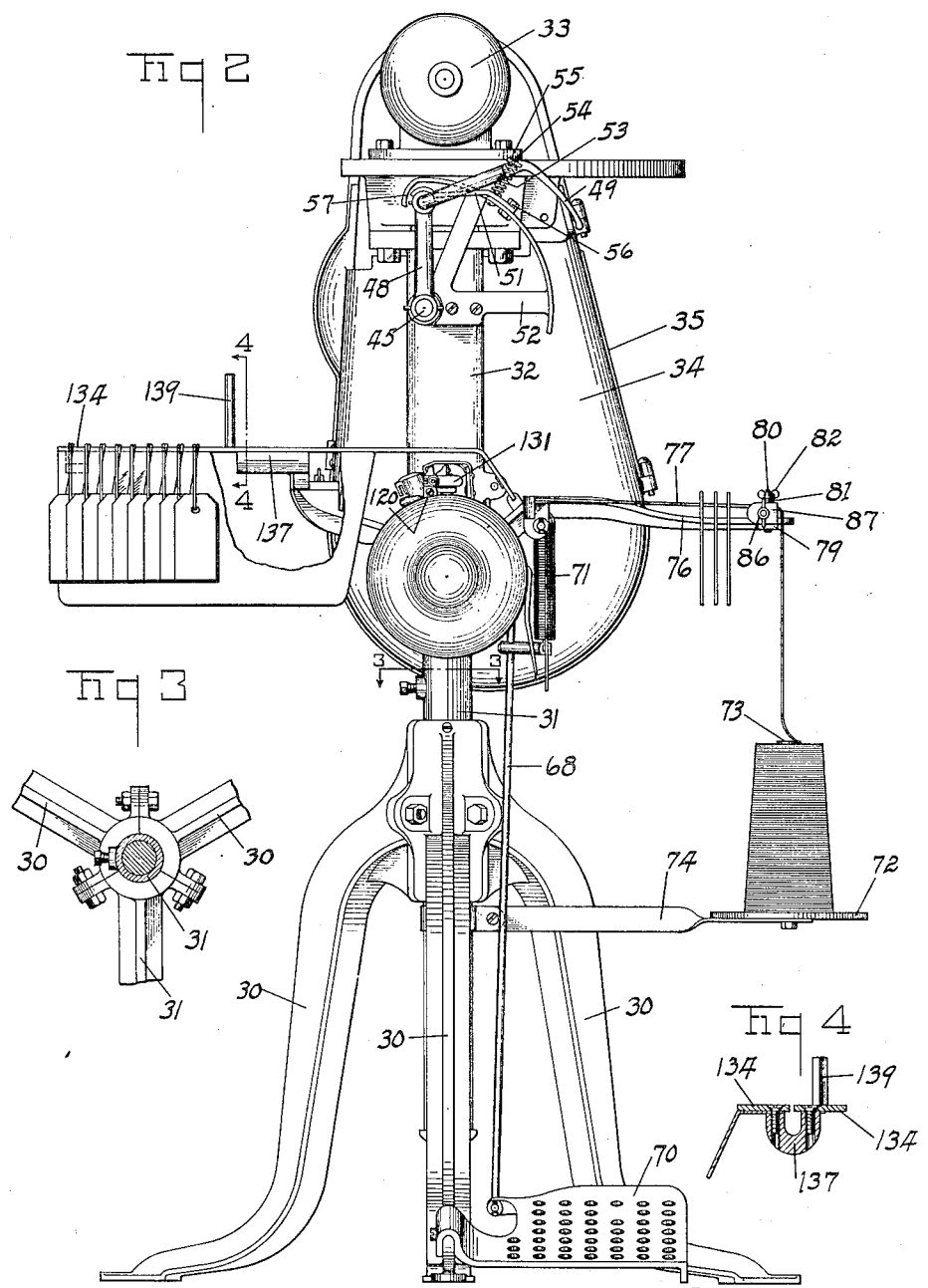

Aug. 31, 1926.
A. H. SAXTON ET AL
1,597,696
TAG LOOP TIER
Filed August 30, 1923  8 Sheets-Sheet 3
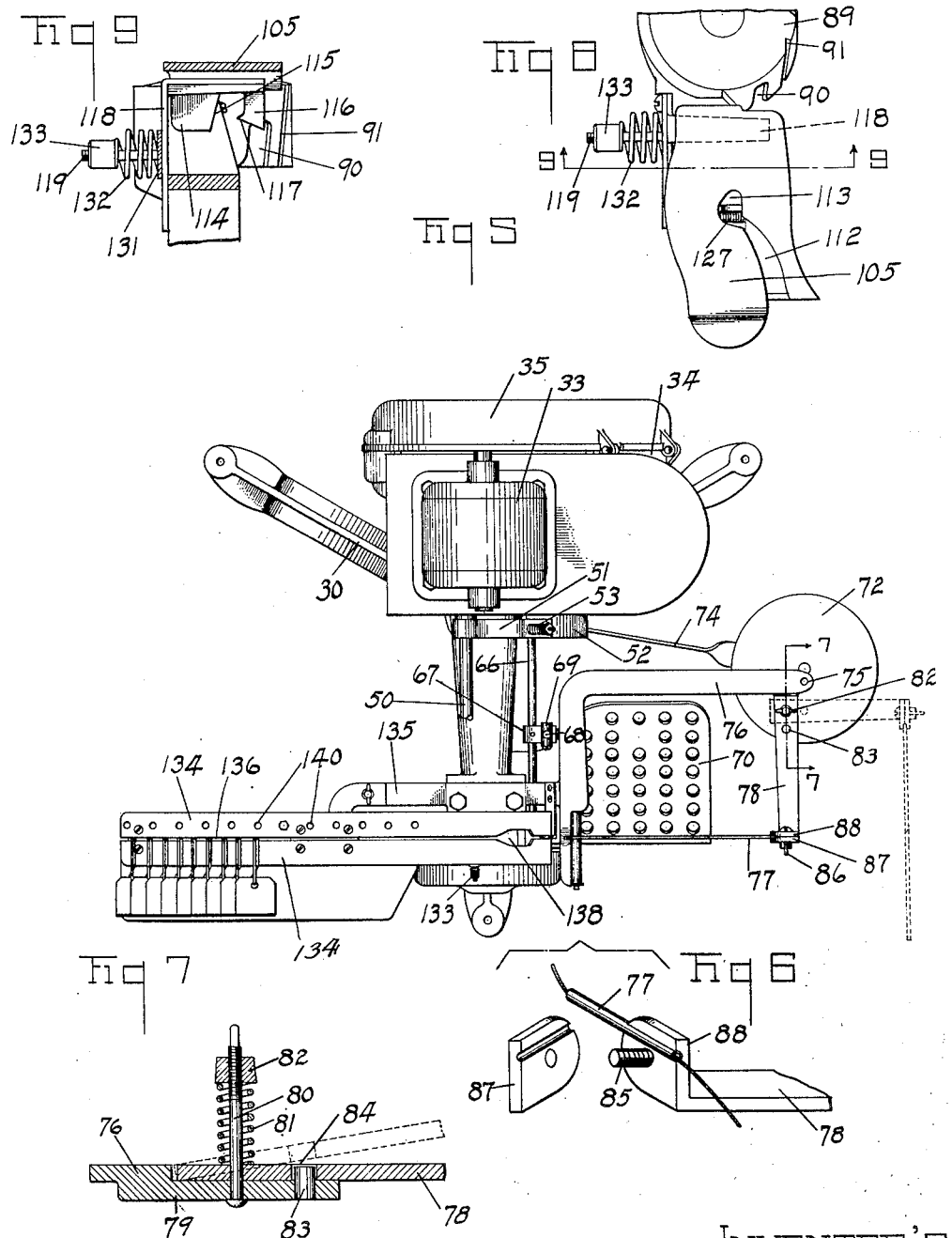

Aug. 31, 1926. 1,597,696
A. H. SAXTON ET AL
TAG LOOP TIER
Filed August 30, 1923   8 Sheets-Sheet 4
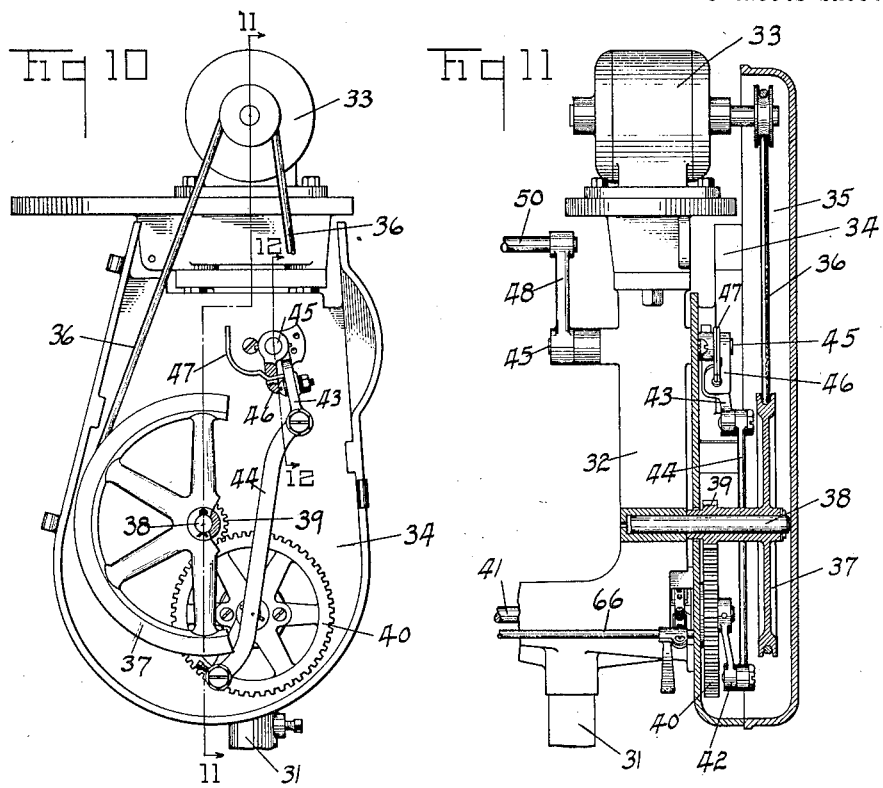
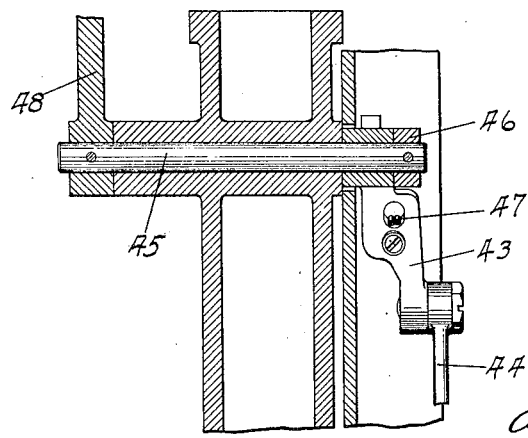
INVENTOR'S
Albert H. Saxton
Joseph J. Beckmayer
by
Owen, Owen & Crampton
ATTORNEYS.

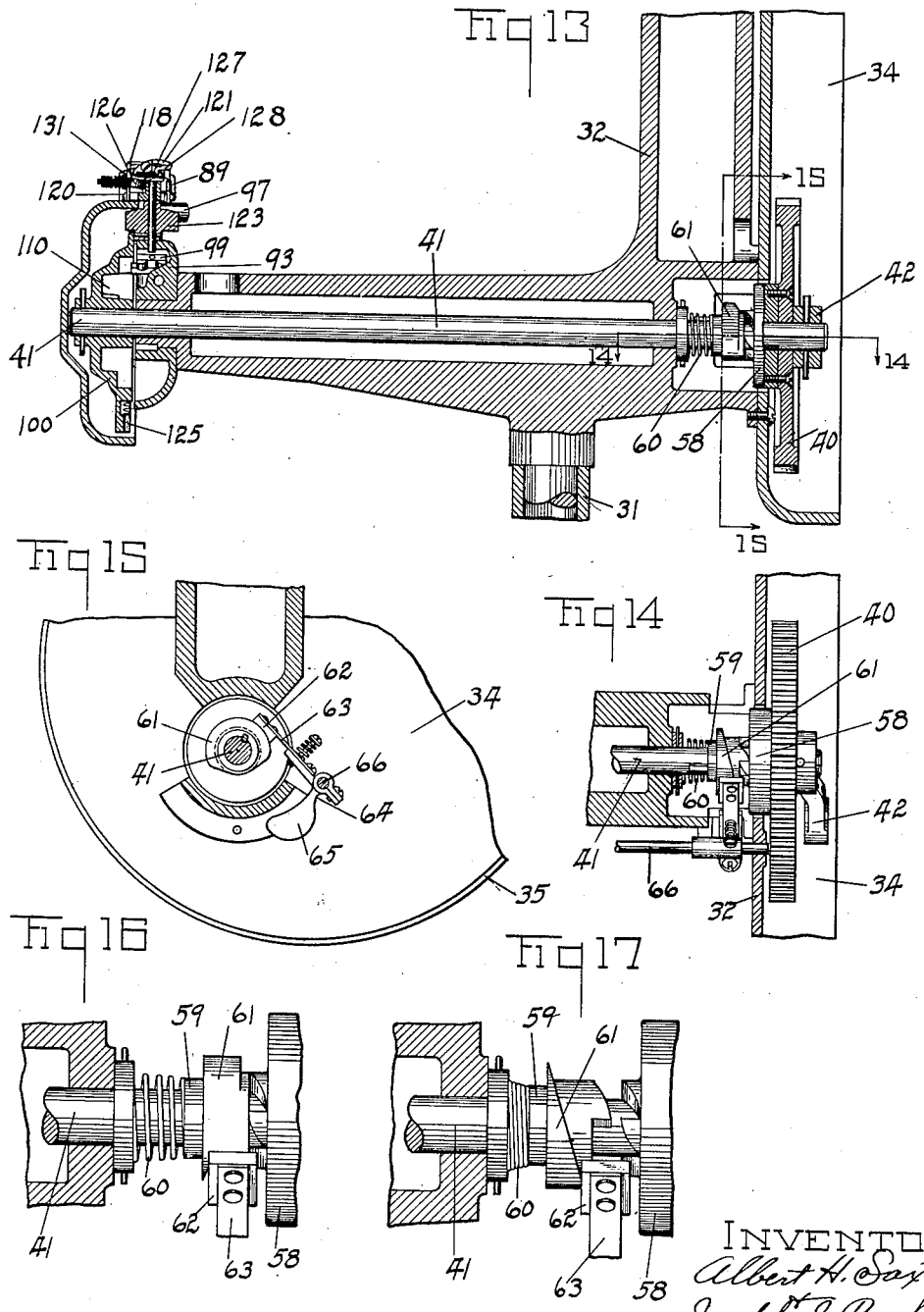

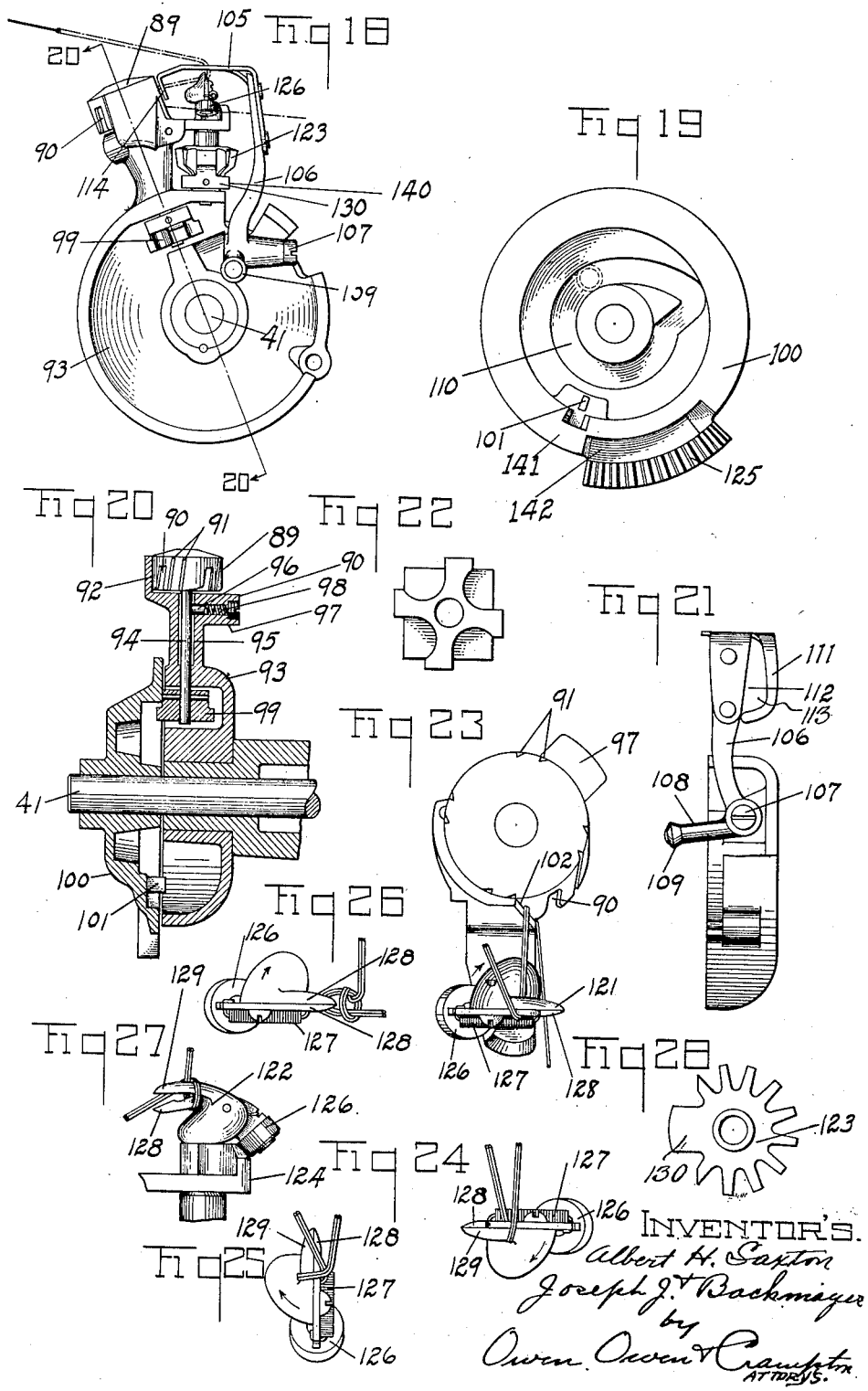

Aug. 31, 1926.

A. H. SAXTON ET AL 1,597,696

TAG LOOP TIER

Filed August 30, 1923   8 Sheets-Sheet 7

Inventor
Albert H. Saxton
& Joseph J. Bachmayer
By
Attorney

Patented Aug. 31, 1926.

1,597,696

UNITED STATES PATENT OFFICE.

ALBERT H. SAXTON AND JOSEPH J. BACHMAYER, OF BLISSFIELD, MICHIGAN, ASSIGNORS TO NATIONAL BUNDLE TYER COMPANY, OF BLISSFIELD, MICHIGAN, A CORPORATION OF MICHIGAN.

TAG-LOOP TIER.

Application filed August 30, 1923. Serial No. 660,104.

Our invention has for its object to provide an efficient means for forming tied loops of string or twine that extend through the eyes of tags whereby the tags may be readily connected to bundles or packages or articles by inserting one side of the loop around or through a part of the bundle or article and then inserting the tag through the said side of the loop in the manner well known in the art. The invention provides an exceedingly efficient machine whereby the loops may be rapidly formed of desired lengths. The invention also provides certain improvements in knot tying mechanisms. The invention also has for its object other advantages and features which will appear from the following description and upon examination of the drawings.

The invention may be contained in structures which in their details vary. To illustrate a practical application of the invention we have shown an embodiment of the invention in the drawings and will describe it hereinafter.

Figure 30:
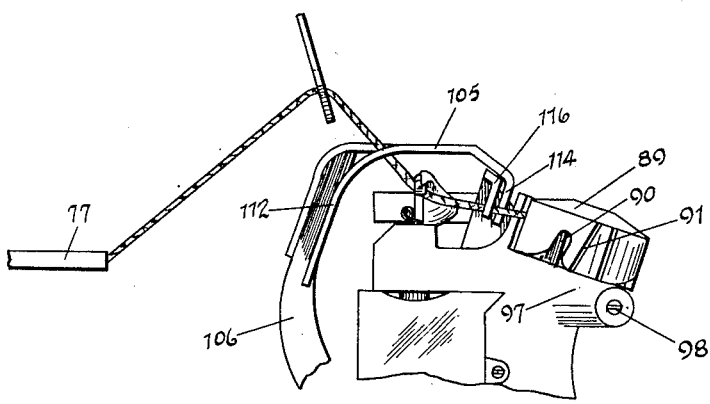
Figure 31:
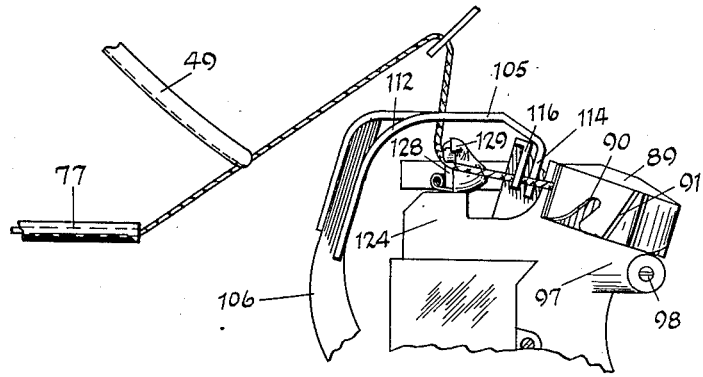
Figure 32:
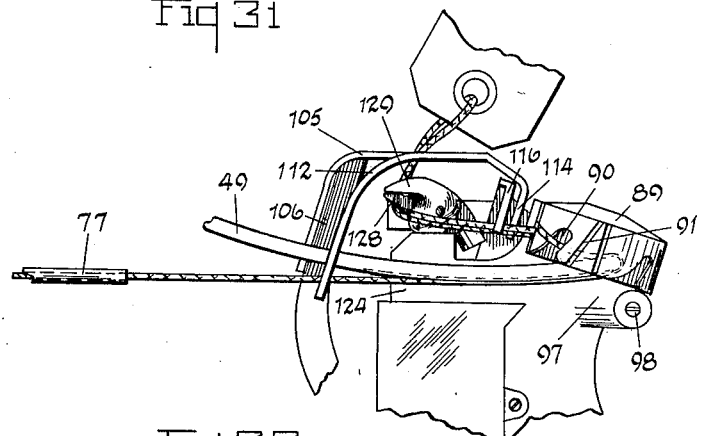
Figure 33:
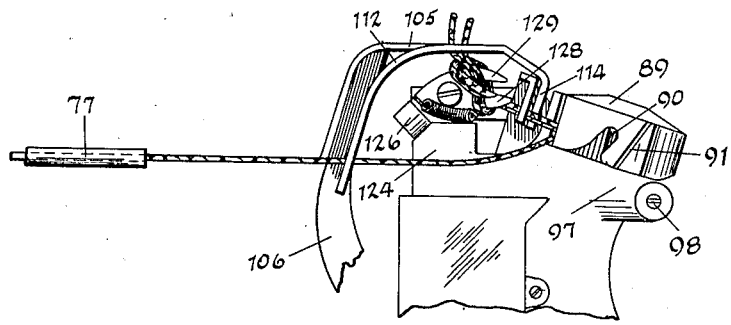

Figure 1 of the drawings illustrates a side view of the machine. Fig. 2 illustrates an end view of the machine. Fig. 3 illustrates the means for adjusting the height of the machine relative to the supporting legs. It is a sectional view taken on the line 3—3 indicated in Fig. 2. Fig. 4 is a sectional view taken on the line 4—4 indicated in Fig. 2. Fig. 5 is a top view of the machine. Fig. 6 illustrates a bracket for supporting the threading tube. Fig. 7 illustrates a sectional view of part of the tube bracket and shows a view taken on the line 7—7 indicated in Fig. 5. Fig. 8 illustrates a top view of the knife member and guide. Fig. 9 is a sectional view taken on the line 9—9 indicated in Fig. 8. Fig. 10 is a side and broken view of a part of the driving mechanism. Fig. 11 is a sectional view taken on the line 11—11 indicated in Fig. 10. Fig. 12 is an enlarged sectional view taken on the line 12—12 indicated in Fig. 10. Fig. 13 is a sectional view showing connection between a part of the driving mechanism and the knot tying mechanism. Fig. 14 is a sectional view taken on the line 14—14 indicated in Fig. 13. Fig. 15 is a view showing the automatic clutch shown in Figs. 13 and 14, and is a sectional view taken on the line 15—15 indicated in Fig. 13. Figs. 16 and 17 illustrate different positions of the automatic clutch. Fig. 18 is a side view of a part of the knot tying mechanism. Fig. 19 is a view of a cam drive for operating the part of the knot tying mechanism shown in Fig. 18. Fig. 20 is a sectional view taken on the line 20—20 indicated in Fig. 18. Fig. 21 is an end view of the guide. Fig. 22 is a bottom view of a four-toothed wheel for producing quarter turns of the cord gripping mechanism. Fig. 23 is a top view of the knot tying mechanism. Figs. 24, 25 and 26 illustrate succeeding positions of the knot tying device relative to the cords or strands in the tying operation. Fig. 27 illustrates a side view of the knot tying device when gripping a portion of the cord or strands tied. Fig. 28 illustrates a top view of a pinion that operates the knot tying device. Fig. 29 illustrates the relation of the tying mechanism to the cord or twine and the tag. Fig. 30 illustrates a position in which the tag may be placed in advance of the introduction of the loop of the cord into the tying mechanism. Fig. 31 illustrates the position of parts at the needle engaging the cord. Fig. 32 illustrates the introduction of the loop into the tying mechanism. Fig. 33 illustrates the engagement of the cord by the bill to complete the knot.

The machine is supported in a tripod formed of the legs 30. In order that the height of the machine may be adjusted it may be provided with the adjustable pedestal 31 and the frame 32 of the machine may be secured to the upper end of the pedestal 31. An electric motor 33 is secured to the frame 32.

It is connected to parts of the mechanism for driving the machine.

Part of the driving mechanism is located in a shell 34 having the cover 35. A belt 36 connects the motor with the driving wheel 37. The wheel 37 is supported on a stub axle 38 which is secured in the frame 32. A pinion 39 is connected to or is formed on the hub of the wheel 37 and meshes with the gear wheel 40. The gear wheel 40 is connected through a suitable clutch to the shaft 41 which is connected to the knot tying mechanism and thus the tying mechanism is driven by the gear wheel 40.

An arm 42 is connected to the shaft 41.

The arm 42 is connected to the arm 43 by means of the link 44. The lengths of the arms 42 and 43 are such as to produce oscillatory movements of the arm 43. The arm 43 is supported for free oscillatory movements on the shaft 45. An arm 46 is keyed to the shaft 45 and has a part that extends over the arm 43 and so as to be engaged by the arm 43 when the arm 43 moves in one direction. The arm 43 is provided with a spring member 47 that yieldingly engages the arm 46 to cause the arm 46 to normally move with the arm 43 but permits the arm 46 to become separated from the arm 43 when the arm 43 swings in one direction and when the shaft 45 or the arm 46 is abnormally held. The spring 47 forms a detent member which prevents injury of parts connected to the shaft 45 if the movement of such parts is intercepted. An arm 48 is connected to the shaft 45. A needle 49 is connected to the end of the arm 48 and is so positioned as to coact with the knot tying mechanism. In order to position the needle it may be connected to a rod 50 or it may be formed integral with the rod 50. The end of the needle thus oscillates in the form of an arc, having its center of rotation in the axis of the shaft 45. In order to yieldingly limit or cushion the return of the needle from the knot tying mechanism a spring 51 is connected to a bracket 52 that is secured to the frame 32 so that the end of the spring 51 will engage the free end of the arm 48. The end portion of the spring 51 may be bent in the form of an arc so as to fit over the end of the arm 48 and thus yieldingly secure the arm 48 in position. To adjust the pressure of the spring 51, a spring 53 may be located on a screw 54 that extends through the spring 51 and a nut 55 may be used for adjusting the tension of the spring 53, the spring 51 being secured at one end to the bracket 52 by means of the bolt 56. A positive stop for the movement of the arm may be provided by an extension of the bracket 52. A finger 57 extends over the end of the arm 48 to positively engage the arm 48 to enable the re-engagement of the arms 43 and 46 by the spring 47 if the arm 46 is abnormally held to cause separation of the arms.

The operation of the knot tying mechanism and the needle is controlled by the clutch that connects the driving shaft 41 with the gear wheel 40. A clutch member 58 is connected to the gear wheel 40 and a clutch member 59 is slip-keyed to the shaft 41. A spring 60 yieldingly presses the clutch member 59 towards the clutch member 58. The clutch member 59 is provided with a cam 61 having a lateral face that may be engaged by the block 62 to separate the clutch member 59 from the clutch member 58 as the shaft 41 is rotated. The spring 60 operates to cause the clutch member 59 to reengage with the clutch member 58 when the block 62 is removed from the face of the cam 61. The block 62 is connected to the end of the spring arm 63 which is connected to the bell crank lever 64 having the weighted arm 65. The arms of the bell crank lever are so positioned as to cause the weight 65 to place the block 62 in position to engage the lateral face of the cam to cause the separation of the clutch members, except as it may be withheld from engagement with the cam 61. The bell crank lever 64 is connected to the shaft 66 which is supported in the frame 32. An arm 67 is connected to the shaft 66 and a rod 68 extends through the arm 67. An adjustable block 69 is secured to the rod 68 and so as to engage the arm 67 when the rod 68 is pulled down a short distance. Thus the rod 66 is rotated through a short arc, which operates to lift the block 62 from engagement with the cam surface 61. The rod 68 is connected to a pedal 70 which is pivotally connected to one of the legs 30 of the tripod. A spring 71 operates to normally maintain the rod in its uppermost position and to raise the rod when the pedal 70 is released. The spring 71 is a tension spring and is connected at one end to the rod 68 and at the other end to a part of the frame of the machine. When, therefore, the pedal 70 is pressed down the knot tying mechanism of the needle is operated and continues to operate until the pedal is released.

The string or twine, or similar material or article, referred to hereinafter broadly as cord, is suitably supported, as on the plate 72. It may be wound in the form of a bobbin and supported on the spindle 73 which is connected to the plate 72. The spindle and plate may be supported by the arm 74 adjustably connected to the adjustable pedestal 31. The ends of the cord may be, if desired, threaded through an opening 75 formed in the angular arm 76 which is connected to the frame 32. In any case, it is threaded through the tube 77 that is supported on an arm 78 that is connected to the arm 76. The arm 78 is preferably pivotally supported in order that the tube 77 may be swung away from the machine for convenience of threading the tube. The arm 78 is pivotally connected to a lip 79 formed integral with the arm 76. It is pivotally secured by the screw 80 and the spring 81 which presses against the arm 78, and a winged nut 82 that may be screwed down to vary the pressure of the spring 81. To securely hold the arm 78 in operating position, a pin 83 is secured in the lip 79 and registers with a hole 84 formed in the arm 78. In order to swing the arm 78 away from the machine it is necessary to lift the arm 78 to clear the pin 83 against the pressure of the spring 81. Likewise in returning the arm in position it is lifted over the end of the pin 83. The arm 78 is thus held from rotation about the screw 80 by means of the pin 83. One end of the tube 77 is secured to the arm 78 by means of the screw 85 and the winged nut 86. It is clamped between the block 87 and the end portion 88 of the arm 78 which is turned upwards. Preferably grooves are formed in opposing faces of the block 87 and the end portion 88 to receive the tube 77.

The free end of the tube 77 terminates in proximity to the knot tying mechanism. The knot tying mechanism is provided with a cord locking means for securing the end of the cord and a loop that may be formed in the cord by the needle. The lock is provided with a cord locking head 89 that has a number of slots 90. In the construction shown it is provided with four slots arranged in spaced relation around the flange of the locking head. The edges of the slots 90 preferably slope away from the lower edge in a direction opposite to that in which the locking head is rotated. The locking head is also provided with a plurality of grooves 91, preferably parallel, and located behind, that is, in a direction opposite to that in which the head rotates, the slots 90. The grooves also have a slope in the same direction as the edges of the slots. The grooves 91 are V-shaped, the following sides of the grooves preferably extending radially from the axis of the locking head, whereby the thread may be securely engaged by the locking head. The locking head is pressed against the cylindrical locking plate 92 that may be in the form of a flange formed integral with the shell 93 that is secured to the frame 32 of the machine. The locking head 89 is connected to a spindle 94 located in the shell 93 and in a bore 95 that has a diameter somewhat larger than the diameter of the spindle 94 and which extends to a point well below the locking head. A spring-pressed pin 96 is located in a bore formed in a boss 97 and is pressed against the upper end of the spindle 94 by means of the spring 98 and so as to press the surface of the locking head 89 against the locking plate 92. The locking head 89 is rotated step-by-step by means of the toothed wheel 99 which is secured to the lower end of the spindle 94 which is operated by a cam sector member 100. The member 100 is provided with a lug 101 which intermittently engages the toothed wheel 99 to produce quarter rotations of the locking head 89 each time the cam sector member 100 is rotated. When, therefore, cord is inserted into the locking head through one of the slots 90 and the locking head 89 is rotated the cord is carried between the locking plate 92 and the locking head and so as to be held by the pressure of the spring 98, as well as by the edges of the slot and the edges of the grooves which coact to engage the cord. The locking plate is provided with an upwardly sloping edge 102 which operates to carry the cord upward and thus to assure the engagement of that portion of the cord that is inserted in the slot.

The locking head 89 and the toothed wheel 99 are so positioned on the spindle 94 as to place the slots 90 in succession in the path of movement of the needle 49. The needle in its succeeding operations passes in proximity to the end of the tube 77 and its end passes to a point located within the head 89. In passing the end of the tube a needle engages the cord and forms a loop near the locking head and carries the loop through one of the slots 90 into the locking head, which begins to rotate as the needle withdraws from the locking head. This carries the cord between the locking head and the locking plate, and thus the loop is engaged.

The needle 49 has a groove 103 which terminates upward to form a grooved nose or point 104. To thread or start the machine the cord may be held in the path of the needle and so as to be engaged in the groove 104. Subsequent movement of the needle will cause the cord to be engaged in the groove 103. It is then carried into the locking head, where it is tied, and the locking head is rotated to engage the loop formed within the locking head. If the end of the cord is held, the end portion that is thus held will be cut off. This leaves the end of the string secure in the locking head and ready for the next operation of the machine.

To properly sever the cord and yet leave an end of the cord secured in the locking head, a guide plate and a severing knife are pivotally supported and operated by the cam sector member 100. A guiding plate 105 is supported on a bell crank lever 106 that is pivotally connected to the shell 93 by means of the screw bolt 107. The bell crank lever 106 is provided with an arm 108 that has a roller 109 which is located in the channel or cam 110 of the cam sector 100 which is properly shaped with reference to the lug 101 as to cause the desired operations of the guide plate 105 relative to the operations of the locking head 89. The guide plate has a finger 111 which is so bent and shaped as to form an opening 112. Through a portion of the opening 112, the needle passes in its movement towards the interior of the locking head, while the string that is held is carried upward to the center of the top of the plate and in the opening 112. The opening 112 narrows to a certain point and then widens to form an enlarged or wider part 113 of the opening through which the cord may extend from the needle to the hand or article that is holding it back or away from the tube 77, while the portion of the string extending from the needle and through the tube 77 passes through the lower part of the opening 112. When the needle has been withdrawn and the loop formed by the needle within the locking head has been secured by the locking head, the plate 105 is moved laterally by the cam 110. In so doing the portion of the cord extending from the locking member to the upper end of the opening 112 is severed by a knife edge formed on the plate 105. The plate 105 has a depending lip 114 which is provided with a sloping knife edge 115 that moves in front of the sloping edge 102 of the locking plate 92 and so as to engage the portion of the string that passes from the locking head through the upper end of the opening 112. This leaves the portion of the string extending from the locking pin to the tube intact. Co-acting to hold the string during the severing operation is a depending lug 116 having a point 117 for engaging the cord and preventing it from slipping by the knife. The lug 116 is formed integral or is connected to a bracket 118 which is secured to the shell 93 by means of the bolt 119 and the screw 120.

The tags to be provided with the tie loops are first threaded on to the tube 77. The cord is then threaded through the tube and one end secured in the locking head, as heretofore described. When, therefore, it is desired to tie a loop on a tag, the tag is drawn from the tube 77 and carried above the locking head. The needle is then depressed, which catches the string between the tag that is thus held and the end of the tube. This brings two strands of the cord in the upper end of the opening 112 and one strand of the cord from the needle end to the tube in the lower end of the opening 112. The needle is slightly withdrawn and the three strands of cord are held by the locking head, the first is secured upon the threading of the machine, the second two strands lead from the upper end of the opening 112 to the tag, and the third leads from the end of the tube. The two strands of cord that pass to the tag are tied. When the tag is raised above the locking head one strand engages the tying bill 121. When the needle carries the cord into the locking head the second strand from the tag is also carried under the bill 121, so that the two strands of cord leading to the tag pass around the bill 121, as illustrated in Fig. 23. The two strands of cord leading to the tag are now tied. This is done by rotation of the bill 121 in the manner well known in the art, the bill twisting or causing the two strands leading to the tag to pass under the two strands leading to the locking head, as shown in Fig. 25, and then opening to engage the two strands leading to the locking head, as shown in Fig. 27. Whereupon the plate 111 is moved laterally to sever the two strands of cord leading to the locking head and to slip the loop of the strands of cord that extend around the bill from the bill, while at the same time the bill holds the strands of cord that are being severed, thus producing a knot in the ends of the strands being severed, as shown in Fig. 26. This forms the tied loop and the tag with its loop may be dropped into a suitable container or otherwise disposed of, as may be desired. The third unsevered strand thus remains locked in the locking head which is drawn upward to the upper end of the opening 112, it passing beneath the bill 121. When the needle in the succeeding operation carries the portion of the cord between the tag and the tube into the locking head the locking head is subsequently rotated to engage that portion of the cord which thus joins the other strand in being locked in the head and in taking its position relative to the bill 121. Then follows again the tying operation as before, and again leaving a portion of the string that extends to the lower end of the opening 112 intact, that is, unsevered and locked in the locking head.

The rotation of the bill head 122 is produced by means of the toothed wheel 123, the head being pivotally supported in a bracket 124 forming a part of the shell 93. The wheel 123 is operated by the sector 125 which is formed integral with the cam sector member 100 and which is so located with reference to the pin 101 as to cause the proper sequential movements relative to the locking head 89 and also relative to the plate 105. The bill is opened by means of a cam wheel 126 which operates upon the end of the bracket 124 which is turned upwards. The bill is closed by means of the spring 127 and when the roller 126 passes off from the end of the bracket. A portion of the under bill 128 extends beneath the upper bill 129 so as to grip the cord in the bill when the roller 126 passes off from the end of the bracket. In order to stop the movement of the bill head after it has completed its rotation the toothed wheel 123 is provided with a flat surface 130 on its hub 140 which is engaged by the surface 141 of the cam sector 100 and brings the toothed wheel to a stop. When the sector 125 operates on the wheel 123, the hub edge moves in the channel 142 of the cam sector 100. Also to prevent free movement of the bill head, a spring member 131 is placed in position to be engaged by the bill head. The spring member 131 is also spring-pressed by the spring 132 which surrounds the rod 119. The spring 132 is a compression spring and is held between the nut 133 and the spring 131, which extends over the bracket 118.

In order to properly position the strands that lead to the tag that is held above or back of the locking head, a slotted plate 134 may be supported above the locking head by means of the arm 135 that is secured to the frame 32 of the machine. The plate 134 may be made double and the two parts slightly spaced apart. In any case, a slot 136 is formed in the plate 134 through which the strands leading to the tag may pass from the bill head 122 to the tag. The parts of the plate 134 are secured in position by means of a channeled head 137 that is connected to the arm 135. The plate is provided with an opening 138 which is wider than that of the slot formed therein, for receiving the needle, the opening 138 being located in line with the slot 136. The plate is suitably shaped to cover the bill head and the locking head and the guide plate to prevent interference of these parts in manipulating the tags.

To produce tied loops in the tags of uniform length a stop plate or pin or guide 139 may be secured in any one of a number of openings, such as the openings 140. This may be used to limit the amount of string that is drawn from the tube and carried over the knotting and severing mechanism.

We claim:

1. In a machine for attaching cord to articles, a tubular member located in engaging relation to the articles, a cord fed through the tubular member, a swinging bracket for supporting the tubular member, means for yieldingly locking the bracket in position, means for knotting the cord.

2. In a machine for attaching cord to articles, a member for maintaining a plurality of the articles in engaging relation to the cord, a driving needle mechanism, a needle member having a grooved nose for engaging and looping the cord between succeeding articles, means for knotting the cord.

3. In a machine for attaching cord to articles, a member for maintaining a plurality of the articles in engaging relation to the cord, a cord lock having a pair of cord engaging members, means for forming loops of cords between the cord lock and the first named member and positioning said loops in cord locking relation to the cord lock.

4. In a machine for attaching cord to articles, a member for maintaining a plurality of the articles in engaging relation to the cord, a cord lock having a pair of cord engaging members, means for forming loops of cord between the cord lock and the first named member and positioning said loops in cord locking relation to the cord lock, a knotter for knotting the cord at the cord lock.

5. In a machine for attaching cord to articles, a member for maintaining a plurality of the articles in engaging relation to the cord, a cord lock having a pair of cord engaging members, means for forming loops of cord between the cord lock and the first named member and positioning said loops in cord locking relation to the cord lock, a knotter for tying the cord held at succeeding points by the cord lock.

6. In a machine for attaching cord to articles, a member for maintaining a plurality of the articles in engaging relation to the cord, a cord lock having a pair of cord engaging members, means for forming loops of cord between the cord lock and the first named member and positioning said loops in cord locking relation to the cord lock, a knotter for tying the cord held at succeeding points by the cord lock, and means for severing the cord between the knotter and the cord lock.

7. In a machine for attaching cord to articles, a member for maintaining a plurality of articles in engaging relation to the cord, a slotted plate, a gauge stop for positioning articles engaged by a cord, means for knotting the cord.

8. In a machine for attaching cord to articles, a member for maintaining a plurality of articles in engaging relation to the cord, a slotted plate, a gauge stop adjustably secured to the plate for positioning articles engaged by a cord, means for knotting the cord.

9. In a machine for attaching cord to articles, a member for maintaining a plurality of articles in engaging relation to the cord, a cord lock, a slotted plate, a gauge stop adjustably secured to the plate for positioning articles engaged by the cord and forming loops of portions of the cord engaged by successive articles, and means for tying the ends of the said loops.

In testimony whereof, we have hereunto signed our names to this specification.

ALBERT H. SAXTON.
JOSEPH J. BACHMAYER.